United States Patent [19]

Schmidt et al.

[11] 3,902,050

[45] Aug. 26, 1975

[54] SERIAL PROGRAMMABLE COMBINATIONAL SWITCHING FUNCTION GENERATOR

[75] Inventors: Rudolf Schmidt, Erlangen; Werner Meier, Bubenreuth; Rainer Wietzeg, Nurnberg; Hartmut Schutz, Rottenbach, all of Germany

[73] Assignee: Siemens Aktiengesellschaft, Munich, Germany

[22] Filed: Apr. 25, 1974

[21] Appl. No.: 464,241

[30] Foreign Application Priority Data

Apr. 26, 1973 Germany............................ 2321200

[52] U.S. Cl..................... 235/152; 307/207; 328/92

[51] Int. Cl.$^{2}$.......................................... H03K 19/20

[58] Field of Search............ 235/152; 307/207, 203; 328/92, 158; 340/172.5

[56] References Cited

UNITED STATES PATENTS

| | | | |
|---|---|---|---|
| 3,579,119 | 5/1971 | Sik-Sang Yau et al. | 328/92 |
| 3,619,583 | 11/1971 | Arnold | 235/152 |
| 3,720,820 | 3/1973 | Cochran | 235/156 |
| 3,731,073 | 5/1973 | Moylan | 235/152 |
| 3,816,725 | 6/1974 | Greer | 235/152 |

*Primary Examiner*—David H. Malzann

*Attorney, Agent, or Firm*—Kenyon & Kenyon Reilly Carr & Chapin

[57] ABSTRACT

A device for performing logic operations in which a Boolean equation to be solved is serially processed in a manner which results in a large reduction in the number of building blocks required while still allowing the solution of long logic equations.

4 Claims, 3 Drawing Figures

SERIAL PROGRAMMABLE COMBINATIONAL SWITCHING FUNCTION GENERATOR

BACKGROUND OF THE INVENTION

This invention relates to logic circuits in general, and more particularly to a device for performing Boolean logic operations. Logic circuits for performing such operations are often required in various industrial applications. For example, these types of circuits are used in industrial control applications in which application a control command is issued upon the fulfillment of a predetermined number of conditions existing as inputs.

Typically, in designing an apparatus of this nature, Boolean equations are written and the equations then implemented using separate gate circuits for each required logic operation. That is, separate logic gates will be used for each AND and OR operation in the Boolean equation. This may be done in the hard wired form or through the use of an appropriate program in a programmable digital computer. In either case, the signals to be combined according to the Boolean equation are then processed simultaneously. With this type of arrangement, whether it is done in software or hardware, the amount of hardware required rises as the quantities of signals to be processed increases.

In view of this, it is the object of the present invention to provide an apparatus for processing an arbitrarilly large number of logic combinations with a defined minimum number of building elements.

SUMMARY OF THE INVENTION

The present invention provides a simple logic circuit which fulfills this requirement. Starting with a plurality of signals which must be combined according to a predetermined Boolean equation, means are provided to serially gate onto a sense line each of these signals in sequence. The apparatus to which these signals are sequentially provided on the sense line includes first, second and third flipflops. Beginning with the first signal in the equation, and with all the flipflops reset, the system is arranged such that if the first signal is true or a logical "1", it will set the first flipflop. Otherwise, if it is a logical "0", it is gated so as to provide a reset command to the first flipflop and a set command to the second flipflop. The sense line is common to all signals and thus, if the first flipflop has once been set by a true or "1" condition and later on a logical "0" or false condition appears on the sense line corresponding to one of the other signals, this "0" signal will act to reset the first flipflop and set the second flipflop. Feedback from the second flipflop is provided to disable the first flipflop from thereafter being set. The first flipflop has its output coupled to an AND gate having as a second input an indication of an OR operation. Assuming a plurality of conditions have all been satisfied prior to an ORing operation, the first flipflop will have been set and have an output. Upon the command of an OR operation, the AND gate is enabled causing the output of the first flipflop which is a "1" to set the third flipflop. Or, in other words, the "1" is transferred to the third flipflop, thereafter the third flipflop cannot be reset. Since the equation was satisfied by the truth of all that came before the OR operation, it is logically true and this is proper. The output of the first and third flipflops are combined in an OR gate so that the end of the equation if either output is a "1", a true or "1" indication will be given. The occurance of an OR command also acts to reset the second flipflop so that the first flipflop is no longer disabled from being set. The result is that if the situation arises where the portion of the equation before the OR operation is not true but that the portion of the equation after the OR operation is true, and in which case the equation should have a final output which is true or a logical "1", the circuit will operate properly. That is, at the end of the first portion which was not true, flip-flop 2 would have been set and flipflop 1 reset and upon occurance of the OR operation, flipflop 3 would remain reset. If nothing further was done, flipflop 1 would remain disabled and the remainder of the equation which might make the final output true could not be processed. However, the occurance of an OR command resets the second flipflop thereby enabling the first flipflop to be set and remain set if all the proper conditions are found to be true. Thus, this arrangement provides a small efficient and independently programmable piece of logic circuitry which can solve long Boolean equations.

A second embodiment of the invention is illustrated for solving Boolean equations which contain not only simple AND and OR logic operations but which also contain parenthetical expressions which must be treated with priority in the equation. The arrangement is quite similar to that of the first embodiment again containing the first, second and third flipflops. However, in addition, there is provided a parenthesis counter, a parenthesis register and a comparator along with additional gating. Each time a parenthesis is opened, the counter is incremented and each time a parenthesis is closed, the counter is decremented. Each time either the third or second flipflop is set, the contents in the counter is transferred to the parenthesis register. The comparator has as inputs the outputs of the counter and the output of the register. These are compared and an output provided on one line if the two are equal and an output provided on another line if the counter has a lower number stored therein than is in the register. These outputs are used for resetting the second and third counters. Either an equal or smaller output from the comparator in combination with a commanded OR operation will reset the second flipflop. A smaller indication along with a commanded AND operation will reset the third counter, when at the same time an input which is not true or logical "0" occurs.

In both embodiments, in order to avoid interference, the use of timing pulses for carrying out the various operations is disclosed. In the second embodiment, a second timing pulse occuring between two normal timing pulses is also provided for use in setting the third flipflop under appropriate conditions.

DETAILED DESCRIPTION OF THE PREFERRED EMBODIMENT

Figure 1:
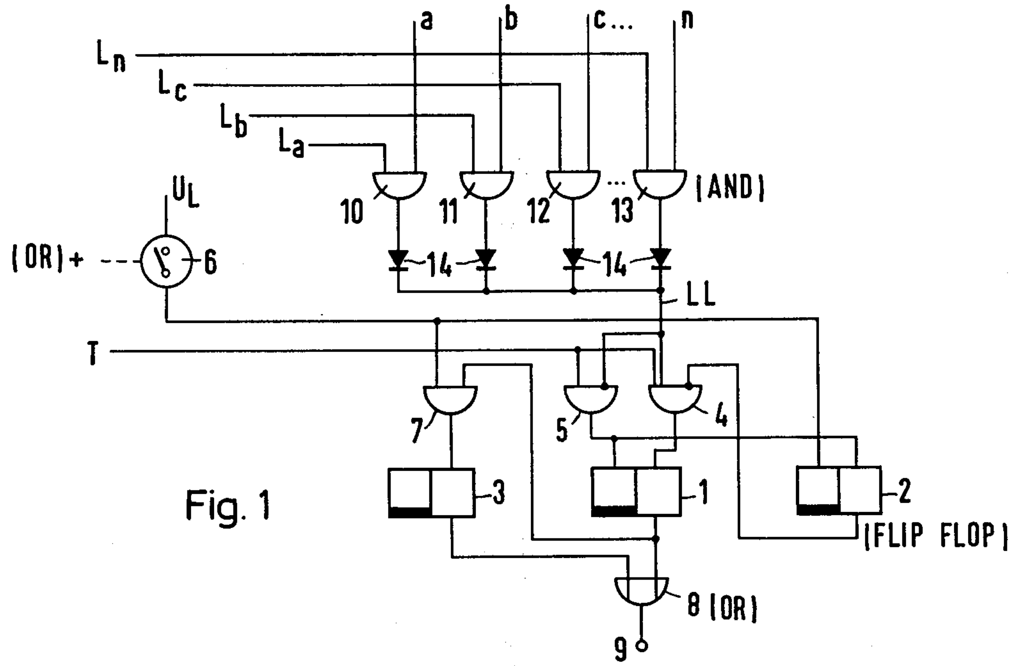
FIG. 1 is a logic diagram of a first embodiment of the present invention.

Before describing the operation of the circuits of FIG. 1, a brief description of the types of logic elements used will be given. The three basic elements used in both embodiments are flipflops, such as the flipflop 2, shown as divided blocks with a darkened portion on one side. These may be typical set-reset flipflops with the darkened side representing the reset half of the flipflop and the blank side of the set portion. Inputs are on top and outputs are on the bottom. An input to the blank section will set the flipflop resulting in a logical "1" output from that side. Similarly, an input to the side having a shaded portion will reset the flipflop resulting in a logical "1" output from that side and a logical "0" output from the other side. The second type of element used in the present invention are AND gates such as AND gates 10 through 13. The nature of these gates is such that they will have a logical "1" output only if both inputs are also "1". Gates 4 and 5 are AND gates having one inverted input. This is indicated by a darkened dot at that input. The operation of these gates is such that a logical "1" at the non-inverted input and a logical "0" at the inverted input will result in a logical "1" output from the gate. The final type of gate used is an OR gate of which an example is gate 8. OR gates and AND gates are distinguished in that the input lines to the OR gate are carried all the way through the OR gate. An OR gate will have a "1" output if either one of its inputs is a "1".

As noted above, the apparatus of the present invention is capable of solving Boolean equations. The apparatus of FIG. 1 is adapted to solve such equations which are in a simple form containing no parenthesis indicating priority operation. As also noted, apparatus of this type will find a typical application in control situations where a number of conditions must be present before a control signal is provided as an output. The arrangement of the particular signals is defined by a Boolean logic equation. On FIG. 1, the input variables are designated $a, b, c, \ldots n$. These are the input variables which must be present, i.e., must be in a logical "1" state in a certain arrangement as defined by a Boolean logic equation before an output command is provided. Each of these input variables is provided as one input to an AND gate with the signals $a$, $b$, $c$ and $n$ being inputs respectively to AND gates 10, 11, 12 and 13. As indicated, operations are carried out in a sequential manner. Thus, the second input to each of the gates is an enabling input labelled respectively $L_a$, $L_b$, $L_c$ and $L_n$. Conventional sequencing means will be used to sequentially enable each of the gates 10, 11, 12 and 13 for a predetermined period of time. It should also be noted that although only four gates are shown, the dots between gates 12 and 13 indicate that as many gates as there are input variables will be provided. The gate outputs are all connected together through decoupling diodes 14 to a common sense line LL. Assume that operation is begun and gate 10 is addressed. If the input variable a is a logical "1", a logical "1" will appear on the line LL. If a is a logical "0", then a logical "0" will appear thereon. Line LL is a non-inverted input to gate 4 and an inverted input to gate 5. Gate 4 has a further inverted input which is coupled to the set output of a flipflop 2. Both gates have an input from line T. At this point, nothing further will happen until a timing pulse appears on line T to enable gates 4 and 5. The function of flipflop 2 will become quite apparent later but for the present, it is assumed to be in a reset condition thereby having a "0" output so that upon the occurrence of a pulse T, gate 4 will be enabled. Assume that the variable a is a logical "1" and the timing pulse T also becomes a logical "1". Gate 4 will then have a "1" output which output is connected to the set input of flipflop 1 and will cause it to be set having a "1" output. The next input is $b$. Assume that $b$ is to be combined with a in a logical AND operation. That is, assume the equation being solved is $a \cdot b \cdot c + d \cdot e \cdot f$. Suppose that $b$ is a logical "0". Gate 11 will be addressed by the signal $L_b$ but its output will remain at "0" because the $b$ input is also a "0". This "0" on line LL will result in gate 5 being enabled so that on occurance of the next timing pulse, it will have a "1" output. The output of gate 5 is a reset input to flipflop 1 and a set input to flip-flop 2. Thus, on occurance of the timing pulse T, flipflop 1 will be reset and flipflop 2 will be set. The output of flipflop 1 will go to a "0" and the output of flipflop 2 to a "1". This "1" output of flipflop 2 is a disabling input to gate 4 and will prevent flipflop 1 from again being reset even if a following input variable is true. In accordance with the same equation, assume that the variable $c$ is a "1". In the manner described above, a "1" will appear on line LL when gate 12 is addressed. The timing pulse will occur but nothing further will happen because gate 4 is disabled and flipflop 1 cannot again be set. This shows that within an ANDing sequence, a "0" or not true condition for any of the variables will result in the resetting of flipflop 1 and the setting of flipflop 2 disabling flipflop 1 from again being set.

Before discussing what happens when the OR operation is encountered, it is well to consider the result if $a$, $b$ and $c$ were all "1"s. In that case, upon the addressing of gate 10 and the inputing of variable a, flipflop 1 would have been set. Since the next two variables were also "1"s, flipflop 1 will remain in the set conditon so that the end of the ANDing sequence given in the above equation, the output of flipflop 1 will remain in the logical "1" state. This output is provided as one input to an OR gate 8 and is also provided as one input to an AND gate 7. The second input to AND gate 7 is from a switch 6. This switch 6 which may be a gate or may be a transistor or FET switch is responsive to a command indicating an ORing operation. That is, as long as AND operations are being carried, switch 6 will be opened. However, upon occurance of an OR operation, the switch will be closed. Closure of the switch will cause the voltage $U_L$ representing a logical "1" to be provided to the other input of AND gate 7. If at the point when this occurs the output of flipflop 1 is in a "1" state, flipflop 3 will be set and have a "1" output. This output is the second input to OR gate 8 which has its output terminal 9.

Again, considering the above equation, if all of the conditions $a$, $b$, and $c$ were true, these conditions all being ANDed before the OR operation, then no matter what the state of the other variables in the equation, the solution to the equation is a logical "1" or true condition. Thus, it is necessary when encountering an OR that this state of flipflop 1 be transferred to the flipflop 3. In this example, such will occur when gate 7 is enabled. As a result, after the total equation is processed, flipflop 3, which cannot be reset, will remain in the "1" state providing a "1" output at terminal 9 indicating the equation is true. This indication may then be gated to an output in conventional fashion.

Returning to the first case where at the end of the first series of ANDing operatins, the output of flipflop 1 was a "0", the additional functions of the output from switch 6 will be discussed. In addition to enabling gate 7, this output is also a reset input to flipflop 2. Thus, whenever an OR condition is encountered, flipflop 2 is reset causing the gate 4 to again be enabled by the "0" output from flipflop 2. The hardware is now back in the same state it was in at the beginning. Because an OR condition has been encountered, it does not matter what has happened before. As long as the remainder of the equation is true, the whole equation will be true. Thus, the remaining input variables $d$, $e$ and $f$, will then be addressed and gated in the same manner described above in connection with the variables $a$, $b$ and $c$. If these are all true, flipflop 1 will remain in the set state and at the end of the equation, a logical "1" will be at the output of flipflop 1 and at the output of gate 8 on terminal 9. However, if any of the input variables is untrue or a logical "0", flipflop 1 will be reset and flipflop 2 set preventing flipflop 1 from again being set. As a result, the solution of the equation will be a logical "0" indicating that the proper combination of input variables for issuing a control command is not present.

In general, it can be said that equations of the following form can be solved using the apparatus of FIG. 1: $a+b \cdot c+d \cdot e \cdot f \cdot g+h \cdot n$. In an equation such as this, the number of groups connected by Boolean operations as well as the individual members of these groups may be of any size desired.

Figure 2:
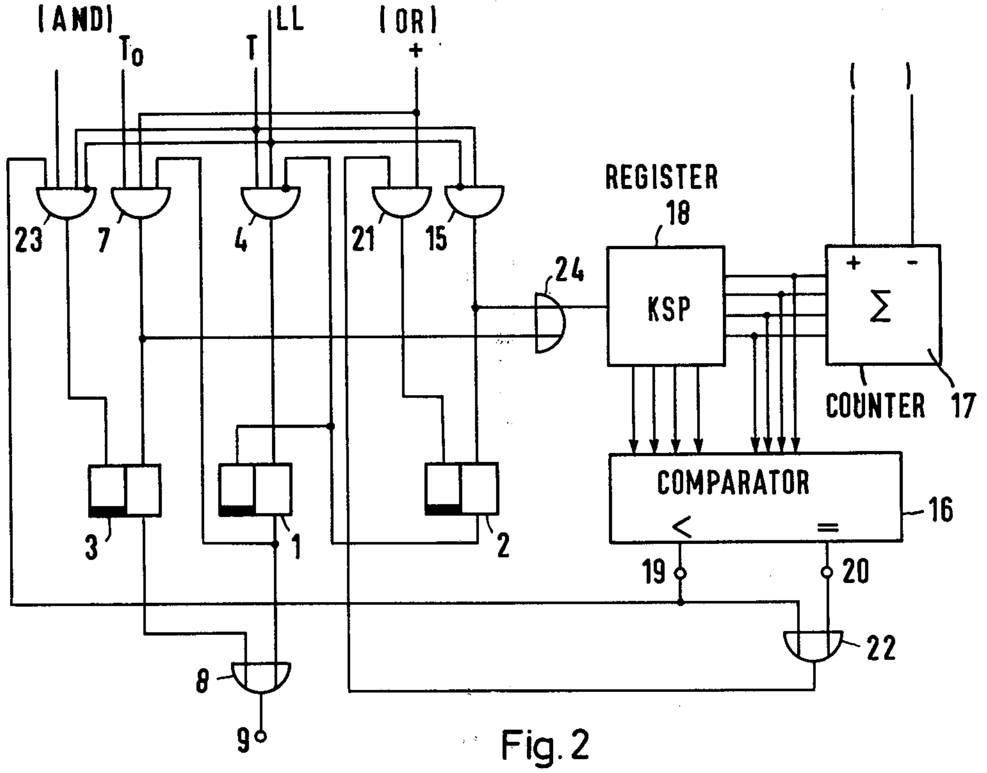
FIG. 2 is a logic diagram of a second embodiment of the present invention.

FIG. 2 illustrates an expanded version of the embodiment of FIG. 1 which permits operating on Boolean equations which contain expressions in parenthesis and which contain logic operations to be treated with priority. The arrangement of the flipflops 1, 2 and 3 is essentially as described above, as is the arrangement of the output OR gate 8 having its output connected to terminal 9. The additional hardware required to handle equations of this nature includes a parenthesis counter 17, a register 18, a comparator 16, and various additional gates to be explained in detail below. Operation of this circuit can best be explained with the aid of a number of examples. Before going into these, it should be noted that gating means such as gates 10 through 13 of FIG. 1 will be provided for as many variables as required to provide serial input signals to the sense line LL.

Consider the equation $((a+b) \cdot c)$. In solving this equation, on the occurance of the first two brackets or parenthesis, the counter 17 which is a reversible up-down counter is incremented twice to have a count of 2 therein. The first variable a appears on the line LL in the manner described above. Presume a is a "1". As before, all the flipflops 1, 2 and 3 will initially be reset and thus the output of flipflop 2 which is a "0" will be enabling gate 4. The occurance of a "1" on line LL along with a timing pulse T provided on line L will result in a "1" output from gate 4 setting flipflop 1. The next element in the equation is an OR operation. A signal indicating this is provided as one input to gates 21 and 7. Gate 21 has as its second input the output of an OR gate 22 which will have a "1" output if a "1" is present at either terminal 19 or 20 of comparator 16. Comparator 16 which is a conventional digital comparator is arranged to have an output on line 20 if its two inputs are equal and to have an output on terminal 19 if its input from counter 17 is less than its input from register 18. In the present example, nothing has yet been transferred to register 18. Thus, under these conditions, the counter output will be greater than the register output and neither output terminal 19 nor output terminal 20 will have a "1" thereon. As noted above, the OR command is also provided as an input to gate 7. This corresponds to gate 7 described above except that an additional input designated $T_0$ is provided. This is an additional timing pulse occuring between the timing pulse T. This permits transfer of data from flipflop 1 to flipflop 3 prior to the gating in of new data. Thus, in the equation under consideration, the occurance of the OR command and then occurance of the additional timing pulse $T_0$ will result in flipflop 3 being set. The output of gate 7 is also one input to an OR gate 24. When it becomes a "1", a "1" will appear at the output of gate 24 which is a gating input to register 18 and will cause the value presently in counter 17 to be transferred to the register. Thus, the number 2 in counter 17 will be transferred into register 18. Assume that $b$ is "0". When $b$ is addressed and appears on line LL and a timing pulse occurs, the input LL which is an inverted input to gate 15 along with the input T will both be present causing gate 15 to have a "1" output setting flipflop 2 to disable gate 4, and resetting flipflop 1. However, since the output of flipflop 1 was already transferred to flipflop 3, the output 9 will continue to be at a "1" state. The output from gate 15 which sets flipflop 2 is also an input to OR gate 24. This input will again cause the count in counter 17 to be transferred to register 18. This count as noted above was two and thus, both counter 17 and register 18 will still have a 2 therein.

The next item encountered in the equation is a close parenthesis. This will result in counter 17 being decremented by one so that the number one is now stored in counter 17 and provided as one input to comparator 16 while the number two is stored in register 18 and provided as the second comparator input. Under these conditions, the counter value is less than that of the register and a "1" will appear on terminal 19. The output of terminal 19 in addition to being one input to OR gate 22 is an input to gate 23. Gate 23 has as its other inputs an AND command line, the timing pulse T and, as an inverting input, the input on sense line LL.

The next operation after closing the parenthesis is an AND operation. Thus, a logical "1" will be present at that input to gate 23, as will a logical "1" input from terminal 19. If $c$ is read in as a "1", this "1" input to the inverting input of gate 23 will cause it to be disabled and its output will remain at "0" upon occurance of a timing pulse on line T. However, if $c$ is a "0", then all proper inputs will be present at gate 23 and it will have a "1" output resetting flipflop 3. As a result, at the end of the equation, terminal 9 will either have a "1" or "0" thereon depending on whether $c$ was true or false.

Consider the case with the same equation where $a$ is "0" and $b$ is "1". When a is gated in, the "0" on line LL will appear at the inverted input of gate 15 and upon the occurance of the timing pulse T, gate 15 will have a "1" output causing flipflop 2 to be set disabling gate 4 and preventing flipflop 1 from being set. The next item is the OR operation. In the embodiment described in FIG. 1, this OR command alone was sufficient to reset the flipflop 2. However, in the present embodiment, the OR input is ANDed in AND gate 21 with the output of OR gate 22. In other words, the resetting flipflop 2 can only occur if, when an OR operation command is received, the output of comparator 16 indicates that the count in counter 17 is equal to or less than the count in register 18. In this particular instance, at the time when flipflop 2 was set the value stored in counter 17 was transferred to the register 18. This value was two and at the occurance of the OR operation, both the value in the register and the value in the counter are two and a "1" output at terminal 20 results. This results in a "1" output from gate 22 enabling gate 21. Thus, when the OR operation command occurs, gate 21 will have a "1" output and will reset flipflop 2 thereby enabling gate 4 so that when the variable *b* is gated in on line LL, flipflop 1 will be set if *b* is a "1". Assuming *b* is a "1", flipflop 1 will be set. The parenthesis are closed decrementing counter 17. Now as *c* is gated in, if *c* is a "1", flipflop 1 will remain set. However, if *c* is a "0", flipflop 2 will be set and flipflop 1 reset. Again, the proper solution to the equation is obtained.

In general terms, each time either flipflop 2 or flipflop 3 is set, the count in counter 17 is transferred to register 18. This allows a comparison to be made in comparator 16 so that at a subsequent time, the proper resetting of these two flipflops can be controlled. Flipflop 2 associated with an OR operation will be reset whenever the OR operation occurs at the same level or a lower parenthesis level. Flipflop 3 will be reset after being set only if an AND operation occurs at a point of lower parenthesis level where the count in counter 17 is less than the count in register 18.

A further example of this type of operation may be given in connection with the following equation:- $(a \cdot b \cdot c + d \cdot e \cdot f \ldots)$. If any of the variables *a*, *b* or *c* is a "0", flipflop 2 will be set in the manner described above. At the time flipflop 2 is set, the parenthesis level stored in counter 17 will be transferred to register 18. Upon occurance of the OR operation, it is necessary that flipflop 2 be reset so that if the remaining conditions are satisfied, the solution to the equation is true or a logical "1". Thus, on occurence of the OR operation command input to gate 21, it is necessary that flipflop 2 be reset. This will occur since an output at a "1" level will be present at terminal 20 and be provided through OR gate 22 to enable gate 21 permitting the resetting of flipflop 2. This is a case where clearing takes place at the same parenthesis level.

Consider the following equation: $(((a+b) \cdot c)+d)$. Assume that *a*, *b* and *d* are all "1"s and that *c* is a "0". In the manner described above, flipflop 1 will be set when *a* is read in. On the occurance of the first OR operation, this "1" out of flipflop 1 will be transferred to set flipflop 3. With both flipflop 1 and flipflop 3 set, *c* at a "0" level will be read in causing flipflop 2 to be set and flipflop 1 to be reset along with the disabling of gate 4. This "0" along with the AND operation command will cause flipflop 3 to be reset. Gate 23 will be enabled by the output terminal 19 of comparator 16. Note that initially counter 17 was incremented three times. At the occurance of the output from gate 7, this value of three was transferred to register 18. After *b* was entered, the counter 17 was decremented one and now contains a value of two so that at the time of the AND operation, a "1" output will be present from comparator 16 on terminal 19. This output on terminal 19 at a "1" level causes a "1" output from gate 22 and thus, acts to enable both gates 21 and 23. At this point, gate 4 is now disabled and both flipflop 1 and flipflop 3 reset indicating, to this point, an untrue condition. When flipflop 2 was set, the value two presently in counter 17 was transferred to register 18. With the closing of the parenthesis after *c*, counter 17 is again decremented. The occurance of the OR operation command at gate 21 will result in a "1" output therefrom resetting flipflop 2 since the "1" output from terminal 19 through gate 22 is enabling gate 21. Gate 4 is now enabled so that if *d* is true or a logical "1", flipflop 1 will be set to give the proper output. From these examples, it can be seen that flipflop 3 will be set each time an OR logic command occurs, and at the time of occurance, flipflop 1 had a "1" output. If the equation is continued at the same or higher parenthesis level, the remainder of the equation is of no consideration since by satisfying the one set of conditions on one side of the OR operation, the equation is already true. On the other hand, if the parenthesis level is lowered, with respect to that which caused the flipflop 3 to be set and an AND condition occurs with a zero input, the flipflop 3 must be cleared by gate 23. This was seen to occur in a number of the examples given above. However, the two following examples will point out clearly this difference. Assume the following equation: $(a \cdot b \cdot c + d \cdot e \cdot f \cdot (g+h) \ldots)$. This equation will be true if either the portion of the equation before the first OR at the highest parenthesis level is true or that portion after the first OR is true. Thus, if *a*, *b* and *c* are all logic ""s, the flipflop 3 will be set at the occurance of the OR command and the auxiliary pulse $T_0$ as inputs to gate 7 in the manner described above, and should remain set no matter what happens in the rest of the equation. Flipflop 3 can be reset only on the occurance of an AND logic command, an untrue or "0" input and an output from terminal 19. The output from terminal 19 will be present only if the value stored in register 18 is greater than the value in counter 17. In the equation now under discussion, upon occurance of the first parenthesis, counter 17 is incremented once. When the output of flipflop 1 is transferred to flipflop 3 by gate 7, the "1" in counter 17 is transferred to register 18. At this point, the two inputs to comparator 16 are equal and the output at terminal 19 remains a logical "0". It will remain so for the remainder of the equation. For example, when the next parenthesis is encountered, counter 17 will be incremented by "1" and will now contain a value greater than that in register 18. Even if a new value is transferred into register 18, it will never be greater than the value in counter 17. Thus, flipflop 3 remains set until the end of the equation.

This equation is also helpful in illustrating a condition under which flipflop 2 is not reset upon occurance of an OR logic command. Consider the case where at least one of *a*, *b* and *c* was "0". This will result in a situation, at the point where the first OR command is encountered, of flipflop 1 being reset, flipflop 2 set and flipflop 3 reset. Since the output of flipflop 1 is a "0", the OR command will not set flipflop 3. Counter 17 had been incremented to one and on the occurance of the output from gate 15 which set flipflop 2, this one was transferred to register 18. Thus, a "1" will be present at terminal 20 of comparator 16 and be provided through OR gate 22 to enable gate 21 so that flipflop 2 will be reset when the first OR command occurs thereby enabling gate 4 to permit flipflop 1 to be set. Assume now that at least one of *d*, *e* and *f* is also "0". Again, flipflop 2 will be set, flipflop 1 reset and flipflop 3 will remain reset. At the time when a "0" input representing *d*, *e* or *f* is received, causing an output from gate 15 to set flipflop 2, the value one stored in counter 17 will be transferred to register 18. Now another parenthesis is opened prior to the input of $g$. The count in counter 17 increases to two. The count of one is still stored in register 18. Thus, the count of counter 17 is greater than that in register 18 and comparator 16 will have an output either at terminal 19 nor at terminal 20. Now when the next OR command is encountered, i.e., that within the parenthesis of higher order, gate 21 will not be enabled and flipflop 2 will not be reset. Thus, the output of flipflop 1 cannot later be set but will continue to remain at "0" as it should.

Consider now the equation: $((a \cdot b \cdot c + d \cdot e \cdot f) \cdot g)$. Assume first that $a$, $b$ and $c$ are all "1"s. At the occurance of the OR command, the "1" then present at the output of flipflop 1 will be transferred to flipflop 3. What occurs with $d$, $e$ and $f$ all contained within this same order of parenthesis is of no concern since the portion of the equation within the parenthesis is already true. However, in addition to this condition within the parenthesis being satisfied, $g$ must also be true. This means that flipflop 3 which has been set must be capable of being reset if $g$ is not true. At the time when a "1" is transferred to flipflop 3 from flipflop 1, the count of two stored in parenthesis counter 17 was transferred to register 18. This count will remain at two in the register even if a further transfer takes place due to an output from gate 15. The parenthesis are then closed and counter 17 decremented by one. The count in counter 17 is now one and that in register 18 two. As a result, comparator 16 will have a "1" output at terminal 19 enabling gate 23. Now, on occurance of the last AND command, if $g$ is "0", gate 23 will have a "1" output in the manner described above resetting flipflop 3 so that the final output is "0". If it occured that the conditions $d$, $e$ and $f$ were all true, flipflop 1 would have been set in the manner described above either alone or along with flipflop 3 if the conditions $a$, $b$ and $c$ were also true. Now upon occurance of g, a $g$ of "1" will have no effect. However, a $g$ of "0" will both reset flipflop 3 as just described and will at the same time set flipflop 2 and reset flipflop 1 in the manner described above. Thus, in any case, the proper output of the equation is obtained.

Thus, the arrangement of FIG. 2 permits processing of Boolean equations of any form and in which the Boolean equations can be presented to the apparatus in the sequence of their usual notation without utilizing special programming means.

Figure 3:
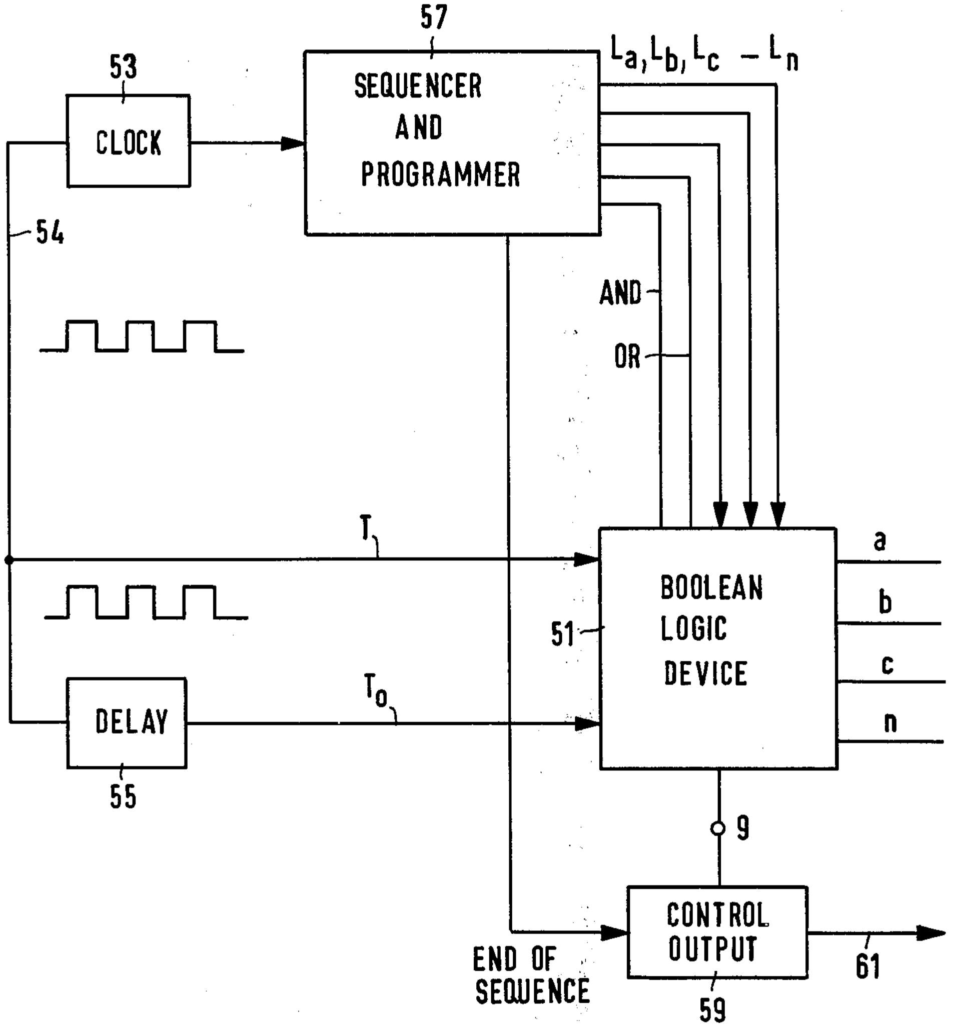
FIG. 3 is a block diagram showing the logic devices of FIGS. 1 and 2 along with control and timing means.

FIG. 3 is an overall block diagram of a system employing the logic device of FIG. 1 or FIG. 2. The device of FIG. 1 or 2 is indicated generally by the reference numeral 51. A clock 53 is provided which is used to generate timing signals through the whole system. Shown is an output line 54 of the clock 53 which provides the timing pulses T mentioned above. Also illustrated is a delay 55 which can be used for generating the timing pulses $T_0$ used in connection with FIG. 2. In well known fashion, the same timing pulses used for the main timing can be delayed to result in the pulses $T_0$ occuring in the intervals between the time pulses T. Also illustrated is a sequencer and programmer 57. Sequencer and programmer 57 will contain conventional logic elements such as counters, gates and the like and will be configured to provide outputs according to the logic equation to be solved, i.e., decoded counter outputs can be used to sequentially gate out the required commands $L_a$, $L_b$, $L_c$, . . . $L_n$, AND, OR, (,), etc. These output lines are indicated as inputs to the logic device 51. Also shown is a control output block 59 having as one input the output from terminal 9 of the logic device 51 and as a second input an end of sequence command from the sequencer and programmer 57. After a full equation has been processed by the logic device, the sequencer and programer will output a command indicating the end of sequence whereupon a control output can be provided on line 61 to a device being controlled. Control output block 59 can comprise simply an AND gate along with any necessary amplifiers, relays or switches needed, in order to provide an output compatible with the equipment being controlled.

Thus, an improved device for solving Boolean logic equations in a simple fashion with small amounts of hardware has been shown. Although specific embodiments have been illustrated and described, it will be obvious to those skilled in the art that various modifications may be made without departing from the spirit of the invention which is intended to be limited solely by the appended claims.

What is claimed is:

1. A device for performing Boolean logic operations comprising:

a. means for providing a plurality of logic signals representing the variables in a Boolean logic equation in serial fashion on a single sense line;

b. a first flip flop having a set input and reset input;

c. first means coupling said sense line to the set input of said first flip flop such that the appearance of a logical "1" signal on said sense line will result in a logic signal appearing at said set input to set said first flip flop;

d. second means coupling said sense line to the reset input of said first flip flop such that the appearance of a logical "0" on said sense line will result in a logic signal appearing at said reset input to reset said first flip flop;

e. a second flip flop having a set and a reset input and having its output coupled as a disabling input to said first means coupling said sense line to the set input of said first flip flop;

f. third means coupling said sense line to the set input of said second flip flop such that the occurence of a logical "0" on said sense line will result in a logic signal appearing at said set input to set said second flip flop;

g. means to provide an input at a logical "1" level indicating a logical OR function, said means coupled to the reset input of said second flip flop;

h. a third flip flop having at least a set input;

i. means coupling the output of said means indicating an OR condition and the output of said first flip flop to the set input of said third flip flop such that the simultaneous occurence of a logical "1" level on both will result in a logic signal appearing at said set input so as to set said third flip flop; and j. an OR gate having as inputs the outputs of said first and third flip flop and providing its output as the final circuit output.

2. A device in accordance with claim 1 and further including:

a. a parenthesis counter having an incrementing input and a decrementing input;

b. a register having the outputs of said counter as data inputs and further having a transfer input;

c. a comparator having as inputs the output of said counter and the output of said register and having a first output which is at a logical "1" when its two inputs are equal and a second output which is at a logical "1" if the input from said counter is less than the input from said register;

d. means enabling said second flipflip to be reset only when at least one of said first and second comparator outputs is present;

e. means for providing a logical "1" level indicating a logical AND command;

f. means to reset said third flipflop in response to the simultaneous occurance of the second output from said comparator, said AND input and a input on said sense line at a "0" logic level; and g. means to initiate a transfer of data from said counter to said register by placing a logical "1" signal on the transfer input to said register in response to the setting of said second or said third flipflop.

3. A device according to claim 2 and further including:

a. means for generating first timing pulses;

b. means for controlling the input of logic signals in response to said timing pulses;

c. means for generating second timing pulses occurring between said first timing pulses; and d. means to enable said third flipflop to be set only when a second timing pulse is present.

4. A device according to claim 1 and further including:

a. means for generating timing pulses; and b. means for controlling the input of logic signals in response to said timing pulses.

* * * * *

UNITED STATES PATENT AND TRADEMARK OFFICE

CERTIFICATE OF CORRECTION

PATENT NO. : 3 902 050

DATED : August 26, 1975

INVENTOR(S) : Rudolf Schmidt et al

It is certified that error appears in the above-identified patent and that said Letters Patent are hereby corrected as shown below:

in column 7, line 39, change "occurence" to --occurance-- in column 8, line 26, change " ""s" to -- "1"s--

Signed and Sealed this

*thirtieth* Day of *December 1975*

[SEAL]

*Attest:*

RUTH C. MASON
*Attesting Officer*

C. MARSHALL DANN
*Commissioner of Patents and Trademarks*